(12) United States Patent
Eickhoff et al.

(10) Patent No.: US 7,727,647 B2
(45) Date of Patent: Jun. 1, 2010

(54) PORTABLE HYDROGEN FUEL CONTAINER CHARGER

(75) Inventors: Steven J. Eickhoff, Plymouth, MN (US); Soumitri N. Kolavennu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 706 days.

(21) Appl. No.: 11/451,165

(22) Filed: Jun. 12, 2006

(65) Prior Publication Data

US 2007/0287059 A1  Dec. 13, 2007

(51) Int. Cl.
*H01M 8/04* (2006.01)

(52) U.S. Cl. .......................... 429/17; 320/101; 429/12; 429/19

(58) Field of Classification Search ............... 429/12, 429/17, 19; 320/101; 205/637; 204/252
See application file for complete search history.

(56) References Cited

U.S. PATENT DOCUMENTS

| | | | |
|---|---|---|---|
| 4,155,712 A | | 5/1979 | Taschek |
| 4,261,955 A | | 4/1981 | Bailey, Jr. et al. |
| 5,372,617 A | | 12/1994 | Kerrebrock et al. |
| 5,534,363 A | * | 7/1996 | Sprouse et al. ............. 429/34 |
| 6,093,501 A | | 7/2000 | Werth |
| 6,179,986 B1 | * | 1/2001 | Swette et al. .............. 205/337 |
| 6,432,566 B1 | | 8/2002 | Condit et al. |
| 6,471,850 B2 | * | 10/2002 | Shiepe et al. .............. 205/628 |
| 6,524,450 B1 | * | 2/2003 | Hara ....................... 204/228.3 |
| 6,866,806 B2 | * | 3/2005 | Andrews et al. ............ 264/250 |
| 2001/0017463 A1 | | 4/2001 | Ovshinsky et al. |
| 2002/0017463 A1 | | 2/2002 | Merida-Donis |
| 2002/0090868 A1 | * | 7/2002 | Schmitman ................ 440/113 |
| 2002/0100682 A1 | | 8/2002 | Kelley et al. |
| 2002/0153263 A1 | | 10/2002 | Velev |
| 2003/0085135 A1 | * | 5/2003 | Andrews et al. ............ 205/637 |

(Continued)

FOREIGN PATENT DOCUMENTS

WO  WO 2005/004273 A2  1/2005

OTHER PUBLICATIONS

Epstein, Alan H., "Millimeter-Scale, MEMS Gas Turbine Engines", *Proceedings of ASME Turbo Expo 2003, Power for Land, Sea, and Air*, Jun. 16-19, 2003, Atlanta, Georgia, USA, (2003),1-28.

Holmes, Andrew S., et al., "Axial-Flux Permanent Magnet Machines for Micropower Generation", *Journal of Microelectromechanical Systems*, vol. 14, No. 1., (2005),54-62.

Pasaogullari, Ugur, "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California,(Nov. 13-20, 2004),1-9.

*Primary Examiner*—Edward Tso
*Assistant Examiner*—Arun Williams
(74) *Attorney, Agent, or Firm*—Crompton Seager & Tufte LLC

(57) ABSTRACT

A portable fuel cell charger has a water source and an electrolyzer coupled to the water source and adapted to be coupled to a power source. A fuel cell cartridge coupler is coupled to the electrolyzer and is adapted to be coupled to a fuel cell cartridge for providing pressurized hydrogen from the electrolyzer to the fuel cell cartridge.

17 Claims, 3 Drawing Sheets

U.S. PATENT DOCUMENTS

| | | |
|---|---|---|
| 2003/0091880 A1* | 5/2003 | Joos et al. .................... 429/21 |
| 2003/0150218 A1* | 8/2003 | Ovshinsky et al. ........... 62/46.3 |
| 2004/0086755 A1 | 5/2004 | Kalal |
| 2004/0118677 A1 | 6/2004 | Streckert et al. |
| 2005/0056042 A1* | 3/2005 | Bourne et al. ................. 62/310 |
| 2005/0199546 A1* | 9/2005 | Rusta-Sallehy et al. .. 210/512.1 |
| 2006/0045228 A1* | 3/2006 | Shiao et al. .................. 376/127 |
| 2006/0185915 A1* | 8/2006 | Kaneko ...................... 180/65.1 |
| 2006/0210850 A1* | 9/2006 | Abouatallah et al. .......... 429/22 |
| 2006/0261349 A1* | 11/2006 | Doering et al. ................ 257/77 |
| 2007/0259227 A1* | 11/2007 | Oishi et al. .................... 429/19 |
| 2007/0277870 A1* | 12/2007 | Wechsler ..................... 136/248 |

* cited by examiner

PORTABLE HYDROGEN FUEL CONTAINER CHARGER

This application claims the benefit of U.S. Provisional Patent Application Ser. No. 60/698,457, filed Jul 12, 2005.

BACKGROUND

Fuel cells are fast becoming high energy density portable fuel sources that may replace many batteries in use today. One form of fuel cell contains a fuel that provides hydrogen to a membrane that operates to product electricity by combining the hydrogen with oxygen to form water. A fuel that may be used, such as metal hydrides or other substance that stores hydrogen and releases it at selected pressures. They may be recharged by exposing them to pressurized hydrogen. The pressurized hydrogen is typically produced in a commercial environment and stored in pressurized containers. There is a need for the ability of consumers to recharge fuel cells in their homes for similar reasons that lead to the ability of consumers to currently recharge common rechargeable batteries. Further, there is a desire to recharge fuel cells quickly.

SUMMARY

A portable fuel cell charger has a water source and an electrolyzer coupled to the water source and adapted to be coupled to a power source. The electrolyzer converts water into oxygen and hydrogen. A fuel cell cartridge coupler is coupled to receive the hydrogen, and is adapted to be coupled to a fuel cell cartridge for providing pressurized hydrogen to the fuel cell cartridge.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
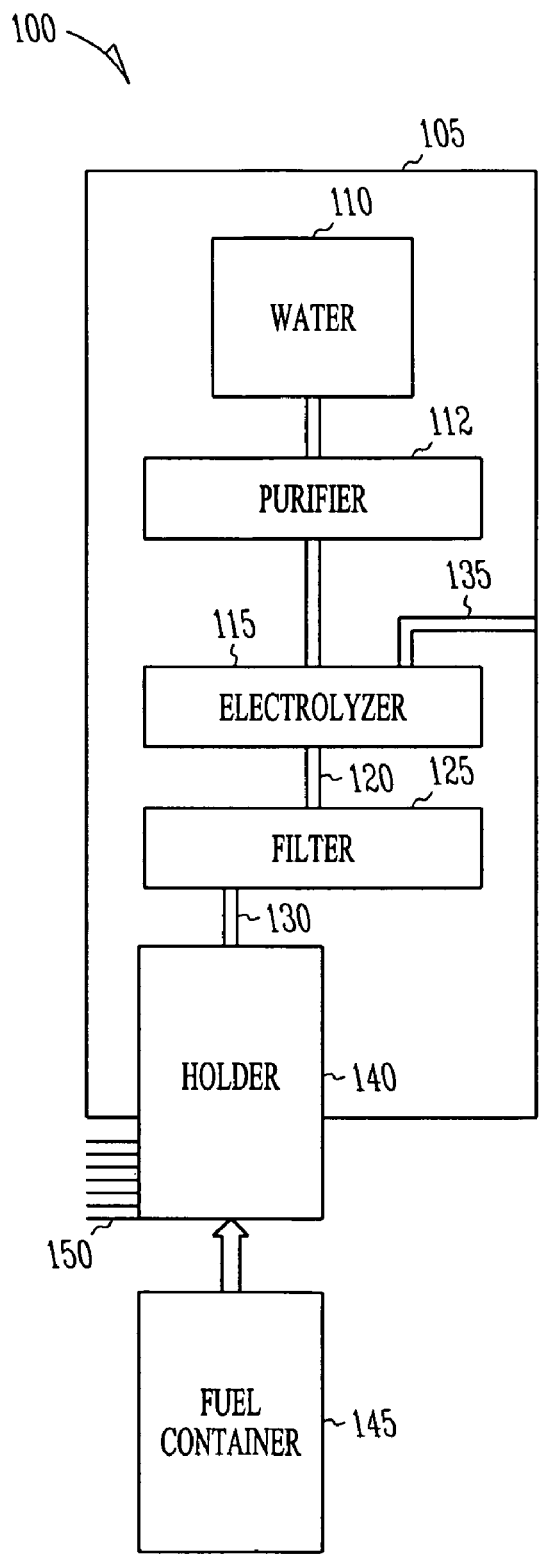
FIG. 1 is a block diagram of a portable hydrogen fuel container charger according to an example embodiment.

FIG. 1 is a block diagram of a portable hydrogen fuel container charger illustrated generally at 100. In one embodiment, the charger 100 is contained in container 105 that may be of convenient and portable size, and also provide for connections to desired power supplies. A water reservoir 110 provides a source of water for the production of hydrogen. In one embodiment, the water may be tap water, filtered water, distilled water, or deionized water. Deionized water or distilled water may be used to minimize contamination of other elements of the charger 100.

In one embodiment, a water purifier 112 may be coupled to the water reservoir 110. The water purifier may be an ion exchange resin based water purifier or other type of water purifier. In further embodiment, a water purifier need not be used. An electrolyzer 115 is coupled to receive water, such as from the water reservoir 110 or water purifier 112. When coupled to a suitable power source, the electrolyzer 115 separates the water into hydrogen and oxygen. In one embodiment, a PEM (proton exchange membrane) such as those used in fuel cells is used as the electrolyzer 115. When a voltage is applied across the PEM with electrodes, and catalyst is applied to its surface, water is split into hydrogen and oxygen, which are generated at the cathode and anode respectively. The gasses are generated on different sides of the membrane. Hydrogen is provided via a passage 120 to a filter 125. Filter 125 removes impurities from the hydrogen stream, and provides to a passage 130. Oxygen may be vented to ambient, such as by passage 135.

Passage 130 provides the hydrogen to holder 140 into which a fuel container for a fuel cell may be inserted for reception of pressurized hydrogen. The fuel container 145 in various embodiments may consist of a medium that can hold hydrogen, such as various metal hydrides or carbon nanotubes or other carbon nano-structures, or may even be a pressurized hydrogen tank if desired. The holder 140 may have appropriate coupling mechanisms to sealingly couple to the fuel container to avoid leakage of hydrogen during filling.

Example metal hydrides that may be reversed or recharged with hydrogen include $LaNi_5H_5$, $FeTiH_2$, $Mg_2NiH_4$, and $TiV_2H_4$. Example reversible chemical hydrides include but are not limited to $NaAlH_4$, $LiAlH_4$, $Mg(AlH_4)_2$, $Ti(AlH_4)_4$, $Fe(BH_4)_4$, $NaBH_4$, and $Ca(BH_4)_2$.

In a further embodiment, an electrolyzer may be used which provides hydrogen and oxygen to a selectively permeable membrane. Such electrolyzers may typically involve discrete electrodes placed in water, with oxygen and hydrogen bubbling up from the electrodes when a current is applied. The selectively permeable membrane allows hydrogen to pass through, while venting oxygen, to ambient or other destination as desired.

In one embodiment, a heat exchanger 150 is positioned proximate that fuel container when coupled to the holder 140 to extract heat. The provision of hydrogen under pressure to the fuel container 145 results in an exothermic reaction, and to increase the speed at which the container may be charged, heat should be extracted. In one embodiment, the heat exchanger 150 comprises fins for air cooling, or may be liquid cooled, such as by use of water from the water reservoir 110. Charging can occur quite quickly, such as under a minute for some sizes of fuel cells, such as cells capable of replacing "AA" batteries or similar sizes.

Figure 2:
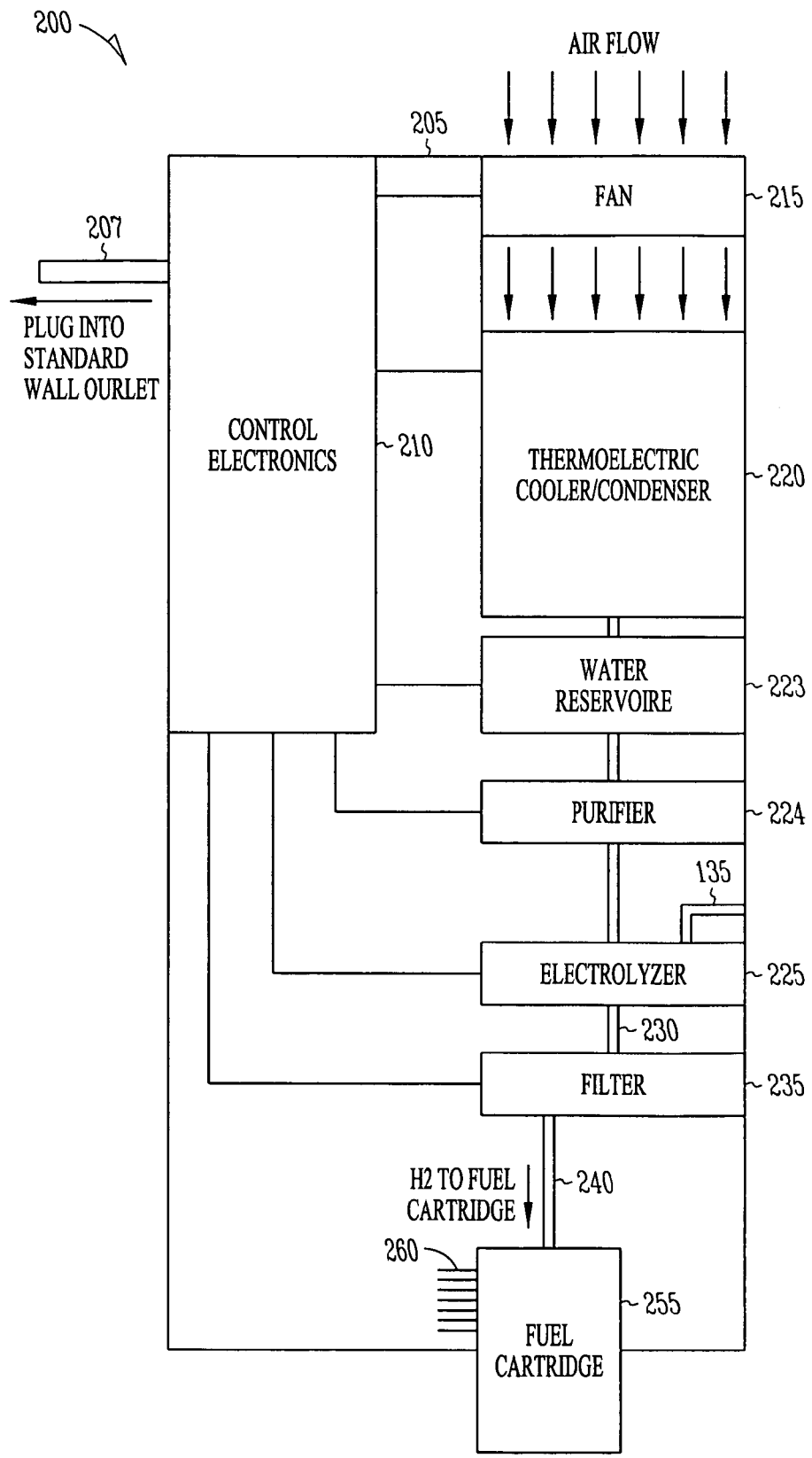
FIG. 2 is a block diagram illustrating further details of a portable hydrogen fuel container charger according to an example embodiment.

FIG. 2 is a block diagram illustrating further details of a portable hydrogen fuel container charger 200. In one embodiment, the charger 200 is contained in container 205 that may be of convenient and portable size, and also provide for connections to desired power supplies. The container may have a connector 207 for connecting to a power supply, such as a standard wall outlet coupled to a power supply grid. In further embodiments, 207 may be coupled to a battery, such as a 12 volt automobile battery.

Control electronics 210 are coupled to various sensor and controllers for controlling charging of fuel containers. In one embodiment, a fan 215 is coupled to a thermoelectric cooler/condenser 220 to provide it ambient air. Cooler/condenser 220 may comprise wicking material or other structures on which water may be condensed and transported. Ambient air has sufficient humidity to allow the cooler/condenser to condense enough water to fill a water reservoir 223 to desired levels. In one embodiment, the water may be tap water, filtered water, or deionized water. Deionized water is obtained from the cooler/condenser 220 and may be used to minimize contamination of other elements of the charger 200.

In one embodiment, a water purifier 224 may be coupled to the water reservoir 223. The water purifier may be an ion exchange resin based water purifier or other type of water purifier. In further embodiment, a water purifier need not be used. An electrolyzer 225 is coupled to receive water, such as from the water reservoir 223 or water purifier 224. When coupled to a suitable power source, the electrolyzer 225 separates the water into hydrogen and oxygen. In one embodiment, a PEM (proton exchange membrane) such as those used in fuel cells is used as the electrolyzer 225. When a voltage is applied across the PEM with electrodes, and catalyst is applied to its surface, water is split into hydrogen and oxygen, which are generated at the cathode and anode respectively. The gasses are generated on different sides of the membrane. Hydrogen is provided via a passage 230 to a filter 235. Filter 235 removes impurities from the hydrogen stream, and provides to a passage 240. Oxygen may be vented to ambient, such as by passage 135. As above, other electrolyzers with or without separation membranes may be used.

Passage 240 provides the hydrogen to a holder 245 into which a fuel container 250 for a fuel cell may be inserted for reception of pressurized hydrogen. The fuel container 250 in various embodiments may consist of a medium that can hold hydrogen, such as various metal hydrides or carbon nanotubes or other carbon nano-structures, or may even be a pressurized hydrogen tank if desired. The holder 250 may have appropriate coupling mechanisms to sealingly couple to the fuel container to avoid leakage of hydrogen during filling.

In one embodiment, a heat exchanger 255 is positioned proximate that fuel container 245 when coupled to the holder 250 to extract heat. The provision of hydrogen under pressure to the fuel container 245 results in an exothermic reaction, and to increase the speed at which the container may be charged, heat should be extracted. In one embodiment, the heat exchanger 255 comprises fins 260 for air cooling, or may be liquid cooled, such as by use of water from the water reservoir 223. Charging can occur quite quickly, such as under a minute for some sizes of fuel cells, such as cells capable of replacing "AA" batteries or similar sizes.

Controller 210 is shown coupled to multiple elements of the charger 200. The connections represent connections to sensors and to controllers. For example, the controller is coupled to a level sensor in the water reservoir 223 to sense the level of water. When the level reaches a predetermined point, no further water is needed, and the fan and thermoelectric cooler/condenser may be turned off by the controller 210.

Controller 210 may also be coupled to a relative humidity sensor to optimize airflow for condensing water. A temperature sensor may be coupled proximate the holder 250 and fuel container 245 to sense heat and pressure, and regulate the cooling of the fuel container and/or pressure of the hydrogen being supplied. It may also sense that the fuel container is fully charged and stop the provision of further hydrogen. The controller 210 may be coupled to status lights, such as a red light for indicating charging is in process and a green light for indicating completion of charging. Audible alarms may be provided in further embodiments.

Figure 3:
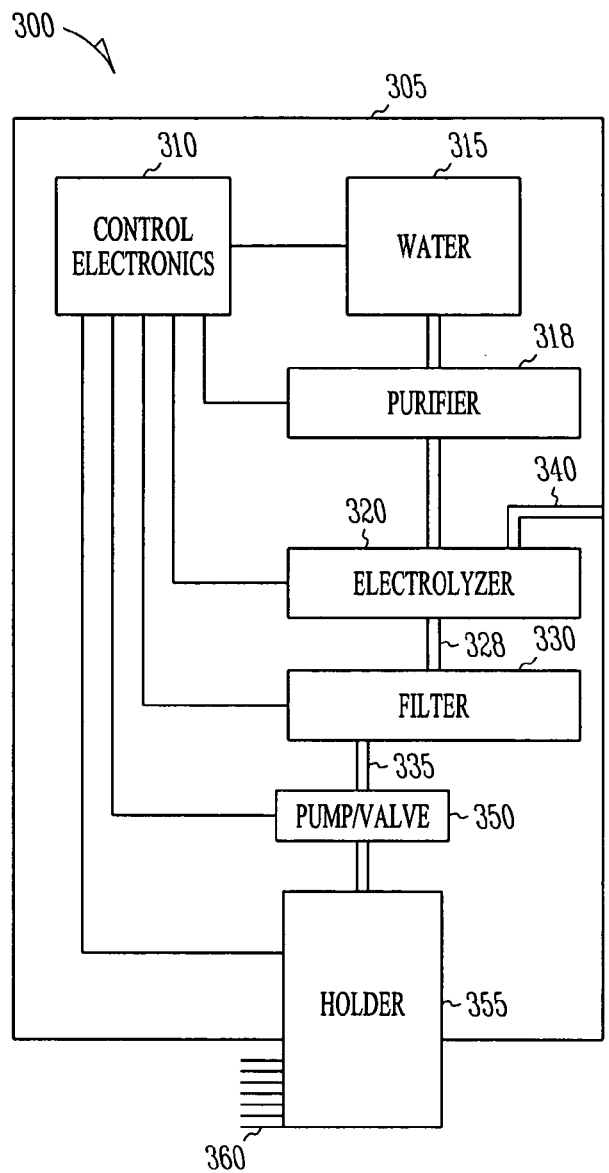
FIG. 3 is a block diagram illustrating details of a further alternative portable hydrogen fuel container charger according to an example embodiment.

FIG. 3 is a block diagram illustrating details of a further alternative portable hydrogen fuel container charger indicated generally at 300. In one embodiment, the charger 300 is contained in container 305 that may be of convenient and portable size, and also provide for connections to desired power supplies. A controller 310 controls operation of the charger 300 through the provision of actuators and switches, as well as sensors to obtain process information as described with respect to previous embodiments. A water reservoir 315 provides a source of water for the production of hydrogen. In one embodiment, the water may be tap water, bottled water, filtered water, or deionized water to name a few sources. Deionized water may be used to minimize contamination of other elements of the charger 300.

In one embodiment, a water purifier 318 may be coupled to the water reservoir 315. The water purifier 318 may be an ion exchange resin based water purifier or other type of water purifier. In further embodiment, a water purifier need not be used. An electrolyzer 320 is coupled to receive water, such as from the water reservoir 315 or water purifier 318. When coupled to a suitable power source, the electrolyzer 320 separates the water into hydrogen and oxygen. In one embodiment, a PEM (proton exchange membrane) such as those used in fuel cells is used as the electrolyzer 320. When a voltage is applied across the PEM with electrodes, and catalyst is applied to its surface, water is split into hydrogen and oxygen, which are generated at the cathode and anode respectively. The gasses are generated on different sides of the membrane. Hydrogen is provided via a passage 328 to a filter 330. Filter 330 removes impurities from the hydrogen stream, and provides to a passage 335. Oxygen may be vented to ambient, such as by passage 135. As above, other electrolyzers with or without separation membranes may be used.

Passage 335 provides the hydrogen to a pump/valve 350 that may be controlled to provide and regulate pressurized hydrogen from passage 335 to a holder 355 into which a fuel container for a fuel cell may be inserted for reception of pressurized hydrogen. The fuel container in various embodiments may consist of a medium that can hold hydrogen, such as various metal hydrides or carbon nanotubes or other carbon nano-structures, or may even be a pressurized hydrogen tank if desired. The holder 335 may have appropriate coupling mechanisms to sealingly couple to the fuel container to avoid leakage of hydrogen during filling.

In one embodiment, a heat exchanger 360 is positioned proximate that fuel container when coupled to the holder 355 to extract heat. The provision of hydrogen under pressure to the fuel container results in an exothermic reaction, and to increase the speed at which the container may be charged, heat should be extracted. In one embodiment, the heat exchanger 360 comprises fins for air cooling, or may be liquid cooled, such as by use of water from the water reservoir 315. Charging can occur quite quickly, such as under a minute for some sizes of fuel cells, such as cells capable of replacing "AA" batteries or similar sizes.

Figure 4:
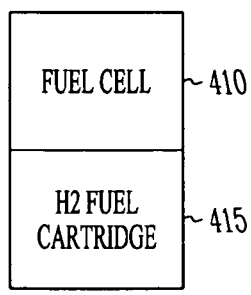
FIG. 4 is a block diagram illustrating a fuel cell with a rechargeable fuel cartridge according to an example embodiment.

FIG. 4 is a block diagram illustrating a fuel cell 410 with a rechargeable fuel cartridge 415 according to an example embodiment. In one embodiment, the fuel cartridge uses a valved connector for coupling to the fuel cell 410 to provide hydrogen to the fuel cell. The valve may also be used to couple to the holder 355 to allow hydrogen to be fed into the fuel cartridge 415 when coupled to the charger 300. The valve prevents hydrogen from leaking from the cartridge when the cartridge is being switched between the fuel cell and charger. In one embodiment, the combination of fuel cell 310 and cartridge 315 are formed to be substantially the same shape as a desired existing battery form factor, such as a nine volt, AA, AAA, C or D battery. Larger and different form factor combinations may also be provided.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A portable fuel cell charger comprising:
   a water source;
   an electrolyzer coupled to the water source that obtains hydrogen from water and is adapted to be coupled to a power source; and
   a fuel cell cartridge coupler that is coupled to the electrolyzer and is adapted to be coupled to a fuel cell cartridge for providing pressurized hydrogen to the fuel cell cartridge; and
   control electronics and sensors coupled to the electrolyzer and fuel cell cartridge coupler for controlling the amount of hydrogen supplied to a coupled fuel cell cartridge;
   wherein the electrolyzer is a proton exchange membrane.

2. The portable fuel cell charger of claim 1 and further comprising a heat exchanger that removes heat from a fuel cell cartridge receiving pressurized hydrogen.

3. The portable fuel cell charger of claim 1 and further comprising:
   a water purifier coupled between the water source and the electrolyzer; and
   a hydrogen filter coupled between the electrolyzer and the fuel cell cartridge.

4. The portable fuel cell charger of claim 1 wherein the fuel cell recharger is adapted to be powered by standard household current, battery, or car battery.

5. The portable fuel cell charger of claim 1 wherein the water source comprises a thermoelectric cooler/condenser that receives ambient and provides it to a water reservoir coupled to the electrolyzer.

6. The portable fuel cell charger of claim 5 and further comprising a fan coupled to the thermoelectric cooler/condenser for increasing airflow across the thermoelectric cooler/condenser.

7. The portable fuel cell charger of claim 1 and further comprising a pump coupled to the fuel cell cartridge coupler for controlling the pressure of hydrogen provided to a coupled fuel cell cartridge.

8. A fuel cell fuel container charger comprising:
   a thermoelectric cooler/condenser;
   a water reservoir coupled to the thermoelectric cooler/condenser;
   means for obtaining hydrogen from water comprising a proton exchange membrane having electrodes to which a voltage can be applied for splitting water into hydrogen and oxygen;
   a fuel cell container coupler that is adapted to be coupled to a fuel container for providing pressurized hydrogen from the means for obtaining hydrogen to the fuel container;
   electronics adapted to receive power and to receive sensor inputs and provide control signals for controlling charging of a fuel container with hydrogen; and
   a water purifier that purifies water from the reservoir prior to obtaining hydrogen from the water; and
   a hydrogen filter that filters hydrogen prior to it being provided to the from the fuel cell container coupler.

9. The fuel cell container charger of claim 8 wherein the electronics receives water level sensor information from the water reservoir, and controls the means for obtaining water as a function of the level of water in the water reservoir.

10. The fuel cell container charger of claim 8 wherein the electronics receives temperature information from a temperature sensor proximate the fuel cell container coupler to control the amount of hydrogen provided to an attached fuel container.

11. The fuel cell container charger of claim 10 and further comprising a pump/valve coupled to the fuel cell container coupler and to the electronics for control of the pump/valve as a function of temperature sensor information and pressure sensor information.

12. The fuel cell container charger of claim 8 and further comprising a heat exchanger that removes heat from a fuel cell container receiving pressurized hydrogen.

13. A method of charging a hydrogen fuel container for a fuel cell using a self contained consumer charger, the method comprising:
    condensing water from ambient air to provide a water source;
    electrolyzing water from the water source to produce pressurized hydrogen and;
    providing the pressurized hydrogen to a fuel cell fuel container to charge the fuel container; and
    wherein the electrolyzing water comprises applying a voltage across a set of electrodes of a proton exchange membrane to produce the pressurized hydrogen.

14. The method of claim 13 and further comprising extracting heat generated by the fuel container.

15. The method of claim 14 wherein sufficient heat is extracted to charge the fuel container in less than one minute.

16. The method of claim 13 wherein the water is purified prior to being electrolyzed, and wherein the hydrogen is filtered prior to being provided to the fuel container.

17. A fuel cell fuel container charger comprising:
    a thermoelectric cooler/condenser;
    a water reservoir coupled to the thermoelectric cooler/condenser;
    means for obtaining hydrogen from water comprising a proton exchange membrane having electrodes to which a voltage can be applied for splitting water into hydrogen and oxygen;
    a fuel cell container coupler that is adapted to be coupled to a fuel container for providing pressurized hydrogen from the means for obtaining hydrogen to the fuel container;
    electronics adapted to receive power and to receive sensor inputs and provide control signals for controlling charging of a fuel container with hydrogen, wherein the electronics receives temperature information from a temperature sensor proximate the fuel cell container coupler to control the amount of hydrogen provided to an attached fuel container; and
    a pump/valve coupled to the fuel cell container coupler and to the electronics for control of the pump/valve as a function of temperature sensor information and pressure sensor information.

* * * * *